US008374655B2

(12) United States Patent
Yamashita et al.

(10) Patent No.: US 8,374,655 B2
(45) Date of Patent: Feb. 12, 2013

(54) MOBILE COMMUNICATION DEVICE AND METHOD FOR CONTROLLING MOBILE COMMUNICATION DEVICE

(75) Inventors: Ikue Yamashita, Higashiosaka (JP); Yuichi Taneya, Osaka (JP)

(73) Assignee: Kyocera Corporation, Kyoto (JP)

( * ) Notice: Subject to any disclaimer, the term of this patent is extended or adjusted under 35 U.S.C. 154(b) by 416 days.

(21) Appl. No.: 10/579,447

(22) PCT Filed: Nov. 24, 2004

(86) PCT No.: PCT/JP2004/017398
§ 371 (c)(1),
(2), (4) Date: May 16, 2006

(87) PCT Pub. No.: WO2005/067269
PCT Pub. Date: Jul. 21, 2005

(65) Prior Publication Data
US 2007/0167196 A1    Jul. 19, 2007

(30) Foreign Application Priority Data
Nov. 26, 2003    (JP) .................................. 2003-396304

(51) Int. Cl.
*H04M 1/00*    (2006.01)
(52) U.S. Cl. ............... 455/575.3; 455/575.1; 455/550.1; 455/411; 455/410; 455/418
(58) Field of Classification Search .... 455/575.1–575.4, 455/550.1; 379/428.01–440
See application file for complete search history.

(56) References Cited

U.S. PATENT DOCUMENTS
6,370,362 B1 *    4/2002    Hansen et al. ............... 455/90.1
(Continued)

FOREIGN PATENT DOCUMENTS
CN    1498002 A    5/2004
JP    07-074819    3/1995
(Continued)

OTHER PUBLICATIONS

A5306ST Toriatsukai Setsumeisho, 2003 Nen 5 Gatsuban, p. 22-24, 211 [online], KDDI Corp., [retrieval date Feb. 10, 2005], Internet <URL:http://au-pro.kddi.com/phone/torisetu/pdf/5306st/5306_torisetu.pdf>; Feb. 10, 2005; 5 sheets (including verification of translation and partial translation.).

(Continued)

*Primary Examiner* — Kathy Wang-Hurst
(74) *Attorney, Agent, or Firm* — Duane Morris LLP

(57) ABSTRACT

An openable/closable mobile phone has a function of locking external keys disposed on an external surface of a main body of the mobile phone, whereby the lock function can be temporarily cancelled without opening the main body. A user holds down a side key (203) provided on a main body lateral surface (202). When a judging unit (307) detects the hold-down, a temporary cancellation unit (308) instructs a lock unit (306) to temporarily cancel the external key operation disablement setting, and instructs a resumption unit (309) to initiate a timer. The resumption unit (309) initiates the timer, and reinitiates the timer when an external key operation signal is received from an operation unit (305). When a given time period elapses, the resumption unit (309) instructs the lock unit (306) to terminate the temporary cancellation. An opened/closed detection unit (310) detects an opened or closed state of a folding part (103), and notifies the detected state to the lock unit (306). The lock unit (306) terminates the temporary cancellation when the folding part is in an opened state.

3 Claims, 4 Drawing Sheets

U.S. PATENT DOCUMENTS

| | | | |
|---|---|---|---|
| 6,782,281 B1* | 8/2004 | Nagasawa | 455/575.3 |
| 6,892,081 B1* | 5/2005 | Elomaa | 455/575.1 |
| 7,013,168 B2 | 3/2006 | Nagasawa | |
| 2002/0077079 A1* | 6/2002 | Ishihara | 455/410 |
| 2004/0092247 A1 | 5/2004 | Tani | 455/410 |

FOREIGN PATENT DOCUMENTS

| | | |
|---|---|---|
| JP | 10-023530 | 1/1998 |
| JP | 11-313376 | 11/1999 |
| JP | 11-355432 | 12/1999 |
| JP | 2000-32098 | 1/2000 |
| JP | 2001-136250 | 5/2001 |
| JP | 2001-285442 | 10/2001 |
| JP | 2001-320477 | 11/2001 |
| JP | 2002-204301 | 7/2002 |
| JP | 2002-271486 | 9/2002 |
| JP | 2003-319035 | 11/2003 |
| JP | 2003-333139 | 11/2003 |
| KR | 20-0287417 | 8/2002 |
| WO | WO-03/075585 | 9/2003 |

OTHER PUBLICATIONS

Office Action from Chinese Patent Application No. 200480034474.2, dated Aug. 27, 2010, 4 pages.

Office Action from Korean Patent Application No. 2006-7012539, mailed on Apr. 22, 2011.

"BREW-Compatible A5306ST Premieres in Tokyo" in Mobile News, Jul. 18, 2003.

Decision of Final Refusal (translation) for JP 2005-516810, mailed Mar. 9, 2010, 1 page.

Decision of Final Refusal (translation) for JP 2010-132146, mailed Apr. 24, 2012, 3 pages.

Notification of Reasons for Refusal for JP 2010-132146, mailed Jan. 24, 2012, 5 pages.

Trial Decision (translation) for JP 2005-516810, mailed Mar. 27, 2012, 10 pages.

JP2010-132146 (Appeal No. 2012-13972) Office Action mailed Dec. 11, 2012.

* cited by examiner

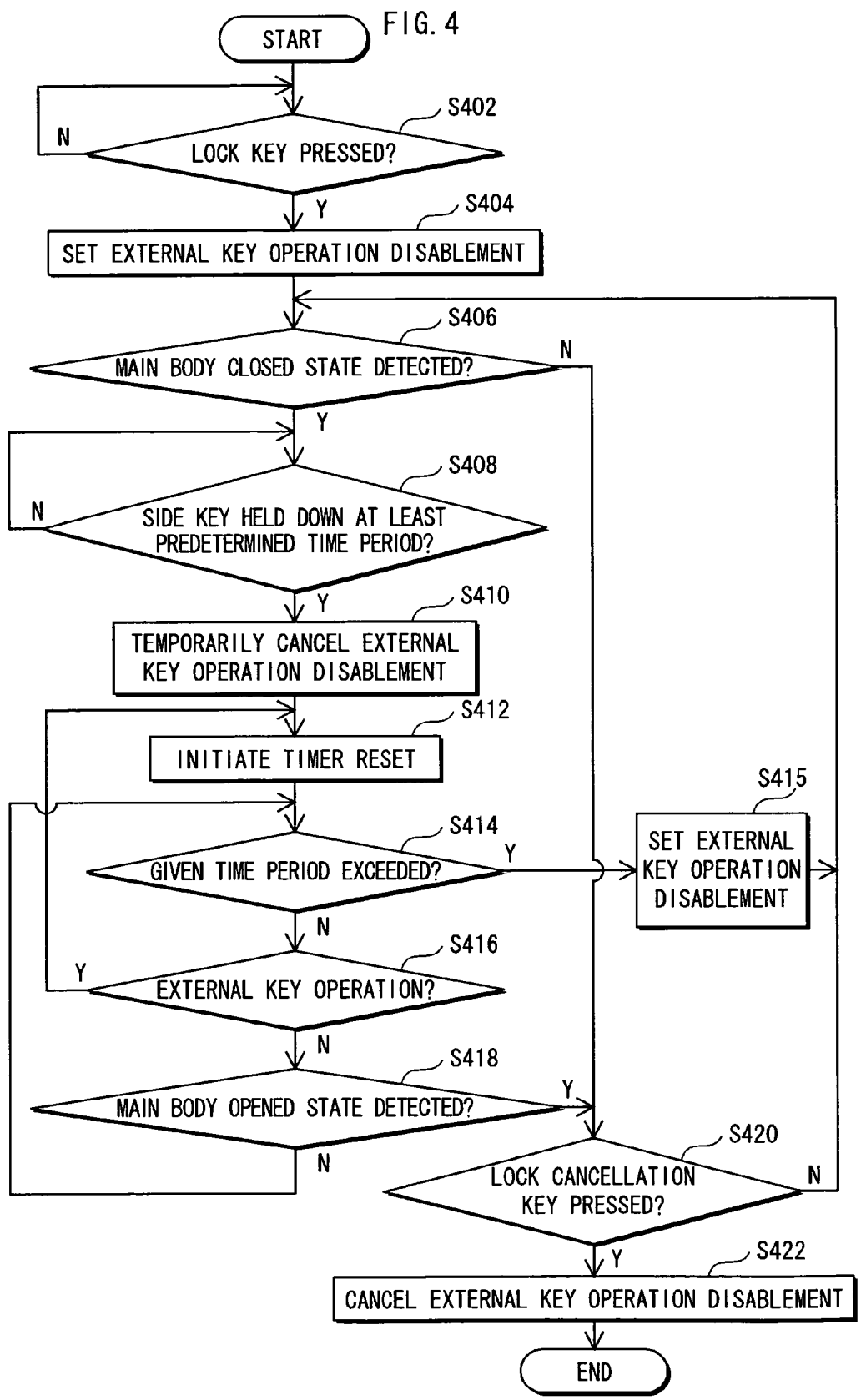

MOBILE COMMUNICATION DEVICE AND METHOD FOR CONTROLLING MOBILE COMMUNICATION DEVICE

TECHNICAL FIELD

The present invention relates to a mobile communication device, and in particular to control technology regarding a key-lock function that disables key operations.

BACKGROUND ART

Mobile phones, which are mobile communication devices, are predominantly folding-type these days. A key-lock function has been implemented to prevent the mistaken-operation of keys arranged on an exterior of a mobile phone that has been folded and put inside a bag. This key-lock function disables the operation of keys on the exterior of the mobile phone in a closed state as a result of a specified key on an operation surface with number keys and the like being pressed when the mobile phone is in an opened state. In order to operate the external keys, the mobile phone must be opened and the specified key must be pressed again to cancel the key operation disablement setting.

Other examples of key locking methods are disclosed in patent documents 1 and 2.

It is to be noted that the functions of mobile phones include not only the conventional calling function, but also emailing, web page browsing, and even FM receiving functions.

For example, mobile phones with an FM receiving function are provided with an external key for adjusting the volume. If a user listening to an FM broadcast wants to adjust the volume while the key-lock function is enabled, they must open the mobile phone, cancel the key-lock function, and again enable the key-lock function after adjusting the volume.

Patent document 1: Japanese Patent Application Publication No. 2000-32098

Patent document 2: Japanese Patent Application Publication No. 2001-285442

DISCLOSURE OF THE INVENTION

Problems Solved by the Invention

As mentioned above, enabling the operation of keys provided on the exterior of the main body when the key-lock function is enabled requires the user to make a point of opening the mobile phone, which is an issue in terms of user-friendliness.

An object of the present invention is to provide a new mobile communication device which reasonably solves the above issue.

Means to Solve the Problems

The object of the present invention is achieved by a mobile communication device having an openable/closable case, a plurality of operation units that are operable regardless of whether the case is opened or closed, and a locking function for disabling processing associated with operation of the operation units, and including an opened/closed detection unit operable to detect an opened/closed state of the case; a judging unit operable to judge whether a predetermined operation has been performed on at least one of the operation units with the case in a closed state and the locking function enabled; and an operation control unit operable, when the judging unit has judged in the affirmative, to enable processing associated with operation of at least one of the operation units.

Effects of the Invention

According to this structure, if a predetermined operation is performed on one of the operation units with the casing closed, processing associated with operation of the operation units is enabled, thereby eliminating the trouble of opening the casing and canceling the lock function.

Also, the operation control unit may disable the enabled processing associated with operation of the at least one operation unit, if the at least one operation unit is not operated within a predetermined time period or if the case is opened.

According to this structure, it is possible for processing associated with operation of the operation units to be disabled when the operation units are not operated for a given period of time such as twenty seconds. This structure eliminates the need to reenable the lock function when the predetermined key operation ends or if the lock function is cancelled due to an operation unit being mistakenly operated.

Similarly, it is possible to disable processing associated with operation of the operation units when the casing is open as well. If the user wants to disable the lock function with the casing open, they need only perform an operation such as pressing a specified lock cancel key.

Also, the mobile communication device, which has a main screen operable to display information with the case in an opened state, may further include a sub-screen operable to display information with the case in a closed state. Here, the operation units may include an operation unit provided on a same surface as the sub-screen and a side key provided on a main body lateral surface, and processing associated with operation of the operation unit provided on the same surface as the sub-screen may be disabled when the lock function is enabled.

According to this structure, it is possible to display information on the sub-screen while the casing is in a closed state by performing a predetermined operation on an operation unit.

Also, the above-mentioned object is achieved by a method for controlling a mobile communication device having an openable/closable case, a plurality of operation units that are operable regardless of whether the case is opened or closed, and a locking function for disabling processing associated with operation of the operation units, including the steps of detecting an opened/closed state of the case; judging whether a predetermined operation has been performed on at least one of the operation units with the case in a closed state and the locking function enabled; and, when the judging unit has judged in the affirmative, enabling processing associated with operation of at least one of the operation units.

According to this method, it is possible to easily operate the operation units provided on the exterior of the casing even when the lock function is enabled.

BRIEF DESCRIPTION OF THE DRAWINGS

FIG. 4 is a flowchart illustrating operations of embodiment 1.

Figure 1:
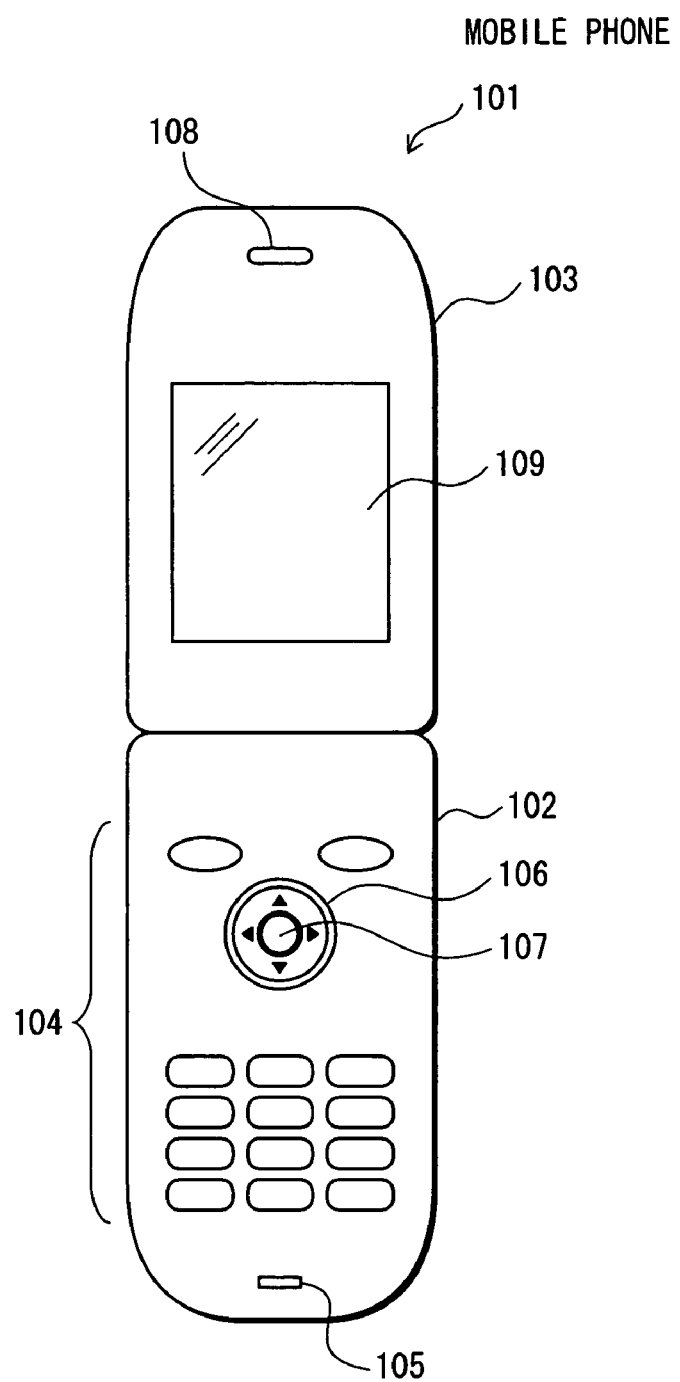
FIG. 1 is a front view of a folding-type mobile phone in an opened state according to embodiment 1 of the present invention.

DESCRIPTION OF THE CHARACTERS 101 mobile phone
102 main body
103 folding part
104 operation key cluster
105 microphone
106 five-way key
107 lock key (lock cancel key)
108 speaker
109 main screen
201 antenna
202 main body lateral surface
203 side key
204 sub-screen
205 five-way key
206 lens
207 light
301 communication unit
302 display unit
303 audio IO unit
304 control unit
305 operation unit
306 lock unit
307 judging unit
308 temporary cancellation unit
309 resumption unit
310 opened/closed detection unit

BEST MODE FOR CARRYING OUT THE INVENTION

An embodiment of a mobile phone, being a mobile communication device pertaining to the present invention, is described below with reference to the drawings.
Embodiment 1

FIG. 1 is a front view of a folding-type mobile phone in an opened state according to embodiment 1 of the present invention.

A mobile phone 101 is composed of a main body 102 and a folding part 103 that is a part of the main body 102. An operation key cluster 104 and a microphone 105 are arranged on the main body 102, and the operation key cluster 104 includes a five-way key 106. A center portion of the five-way key 106 constitutes a lock key 107, being a specified key. A main screen 109 and a speaker 108 are disposed in the folding part 103.

Figure 2:
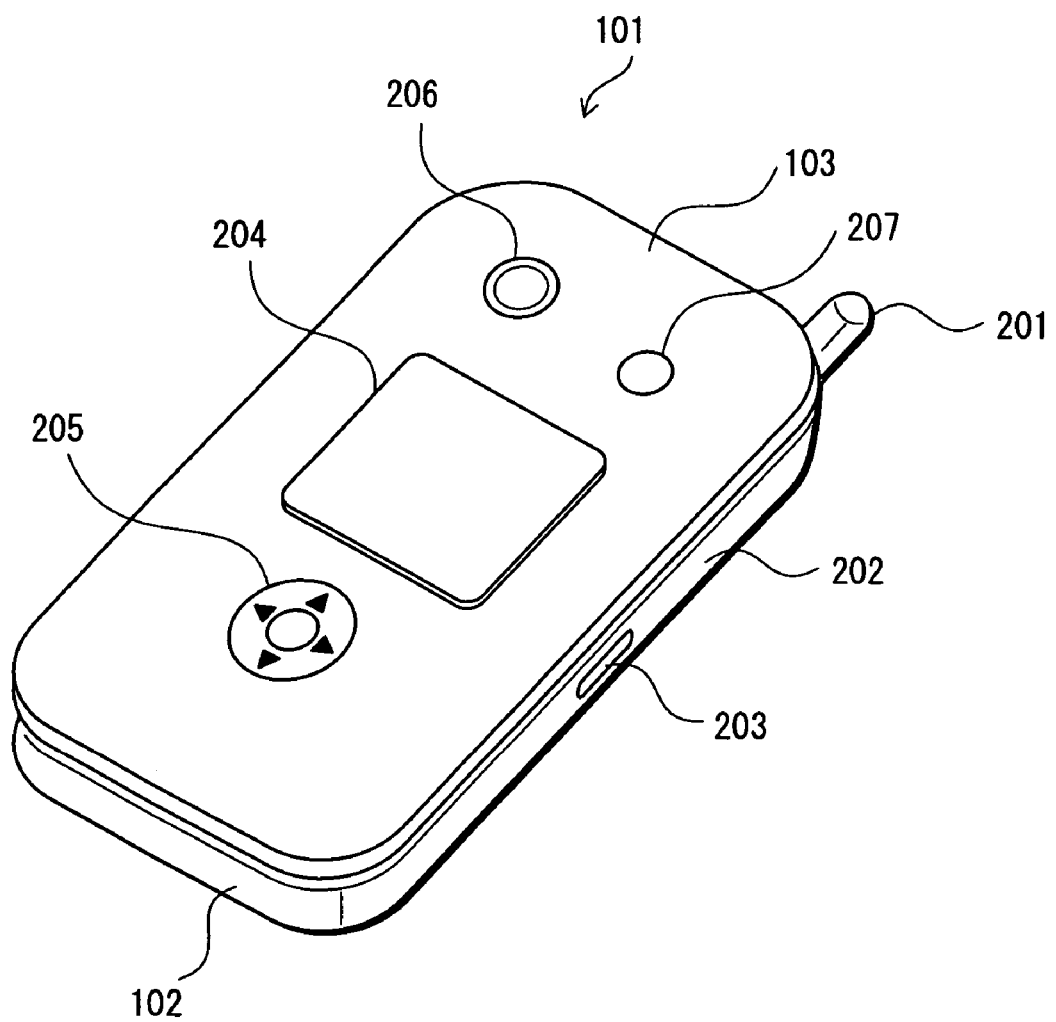
FIG. 2 is a perspective view of a closed state of the folded mobile phone according to embodiment 1.

FIG. 2 is a perspective view of a closed state of the folded mobile phone according to embodiment 1.

An antenna 201 is retractably provided in an upper right portion of the main body 102, and a side key 203 is disposed on a right lateral face 202 of the main body 102. A sub-screen 204, a five-way key 205, a lens 206 and a light 207 are disposed on a surface of the folding part 103 in a folded state.

Figure 3:
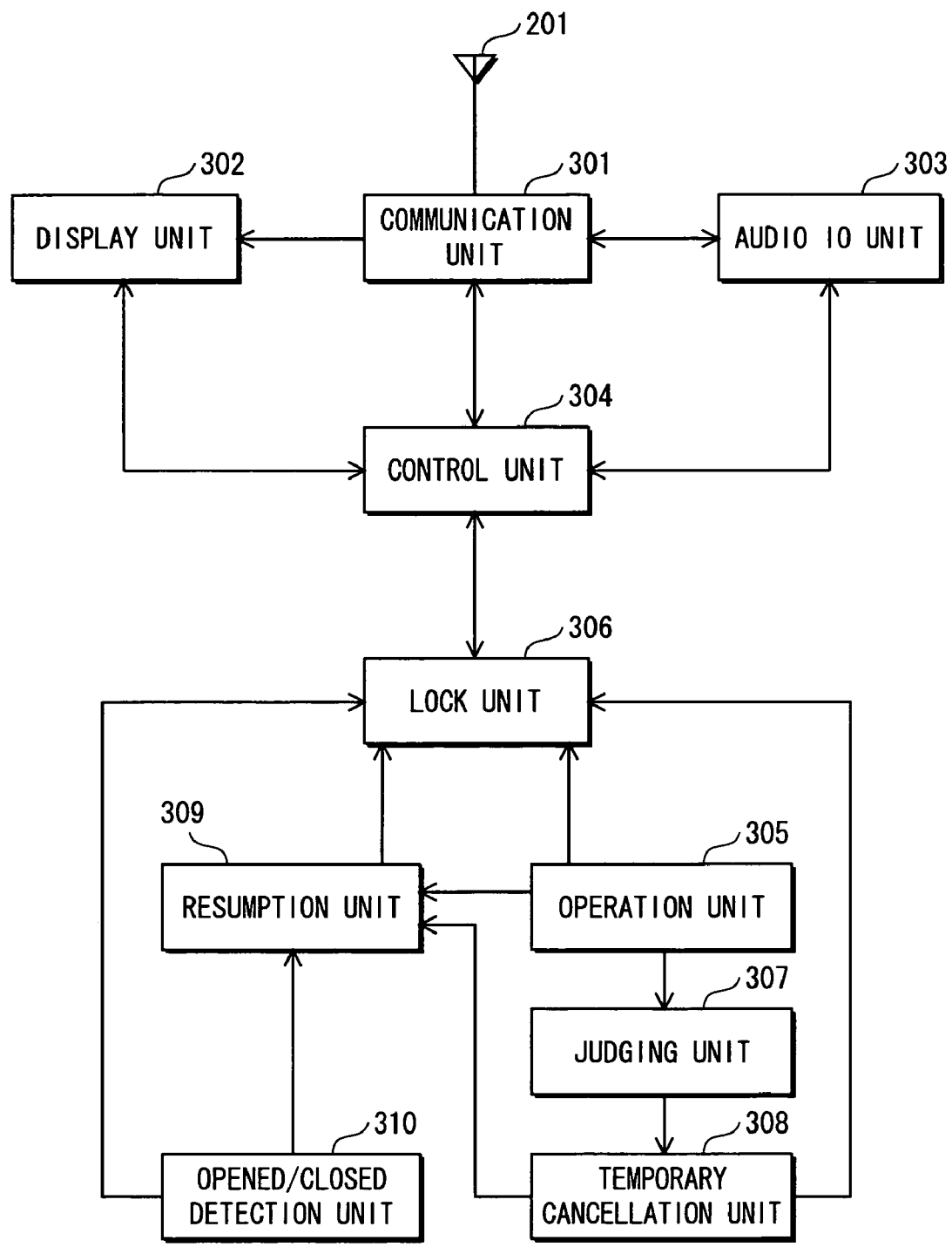
FIG. 3 shows a construction of embodiment 1.

With the mobile phone 101, the side key 203 and the five-way key 205 are included in the keys that are provided on an exterior of the main body 102 (hereinafter, "external keys"). FIG. 3 shows a construction of embodiment 1. The mobile phone 101 includes an antenna 201, a communication unit 301, a display unit 302, an audio IO (Input/Output) unit 303, a control unit 304, an operation unit 305, a lock unit 306, a judging unit 307, a temporary cancellation unit 308, a resumption unit 309 and an opened/closed detection unit 310.

The antenna 201 performs wireless communication with a base station (not depicted). The antenna 201 notifies signals received from the base station to the communication unit 301, and transmits signals notified by the communication unit 301 to the base station.

The communication unit 301 demodulates and processes signals notified by the antenna 201, and, under the control of the control unit 304, outputs audio signals to the audio IO unit 303 and display signals to the display unit 302. The communication unit 301 also notifies signals resulting from processing of the audio signal input from the audio IO unit 303 to the antenna 201, and notifies signals resulting from conversion of information displayed on the display 302 to the antenna 201.

The display unit 302 is composed of the main screen 109 and the sub-screen 204, and is realized by an LCD display. Note that a resolution of the sub-screen 204 is inferior to that of the main screen 109. Display is performed on the main screen 109 with the folding part 103 in an opened state, and on the sub-screen 204 when the folding part 103 is in a closed state.

Content displayed by the display unit 302 includes, for example, email content notified by the communication unit 301, EzWeb page content, and information input by the operation unit 305, whereby the content is controlled by the control unit 304.

The audio IO unit 303 is realized by the microphone 105 and the speaker 108, and inputs and outputs audio communication content under the control of the control unit 304. The control unit 304 controls the communication unit 301 and the audio IO unit 303, and displays information on the display unit 302 according to operation content notified by the operation unit 305 via the lock unit 306. The control unit 304 also controls the audio IO unit 303 and display content of the display unit 302 according to content notified by the communication unit 301. The control unit 304 also controls a camera unit and an FM receiving unit which are not depicted.

The operation unit 305 includes the operation key cluster 104, the side key 203 and the five-way key 205, receives user operations, and notifies key operation signals to the control unit 304 via the lock unit 306.

The operation unit 305 notifies an operation signal to the lock unit 306 when a press operation of the lock key 107 is received from a user. Note that if external key operation signals are disabled by the lock unit 306, the lock key 107 functions as the lock cancellation key. If the lock key 107 is not specially provided, it is possible to lock the keys using the five-way key 106 by having the center key of the five-way key function as a select key, as in the prior art.

The operation unit 305 notifies an operation signal to the lock unit 306, the judging unit 307 and the resumption unit 309 when a press operation of the side key 203 or the five-way key 205 on the folding part 103 is received.

When notification of a signal resulting from depression of the lock key 107 is received from the operation unit 305, the lock unit 306 disables operations even if notification of an external key operation signal is received. The lock unit 306 cancels this operation disablement setting on receipt of a signal corresponding to depression of the lock cancellation key 107 (same as the lock key) from the operation unit 305 in the case where a detection notification indicating that the folding part 103 is open is received from the opened/closed detection unit 310.

Even if an operation signal of an external key such as the side key 203 or the five-way key 205 is received from the operation unit 305, the lock unit 306 does not notify the operation signal to the control unit 304 if external key operation disablement is set. The lock unit 306 notifies an operation signal of the side key 203 or the five-way key 205 from the operation unit 305 to the control unit 304 on receipt of an instruction to temporarily cancel the external key operation disablement setting from the temporary cancellation unit 308 if notification that the folding part 103 is folded (i.e., in a closed state) is received from the opened/closed detection unit 310. External key operation signals continue to be notified to the control unit 304 until an instruction terminating the temporary cancellation is received from the resumption unit 309.

On receipt of the instruction terminating the temporary cancellation from the resumption unit 309, the lock unit 306 again disables external key operations.

The judging unit 307 judges whether an operation signal indicating depression of the side key 203 has continued at least a predetermined period of time such as two seconds. In other words, the judging unit 307 judges whether the side key 203 is being held down, and notifies the temporary cancellation unit 308 if the judgment is in the affirmative. No operation is performed if the side key 203 is not being held down.

The temporary cancellation unit 308 instructs the lock unit 306 to temporarily cancel the external key operation disablement setting, and instructs the resumption unit 309 to initiate a timer when notification of a hold-down operation of the side key 203 is received from the judging unit 307.

The resumption unit 309, which includes a timer, resets the timer and starts measuring time on receipt of the timer initiation instruction from the temporary cancellation unit 308. The resumption unit 309 also resets the timer and again starts measuring time when notification of an external key operation signal is received from the operation unit 305. When this measured time reaches a predetermined time period of 20 seconds for example, the resumption unit 309 notifies an instruction to terminate the temporary cancellation to the lock unit 306.

Note that the resumption unit 309 also instructs the lock unit 306 to terminate the temporary cancellation when notification of an opened state is received from the opened/closed detection unit 310.

The opened/closed detection unit 310 detects whether the folding part 103 is in an unfolded (i.e., opened) state or a folded (i.e., closed) state, and notifies the detected state to the lock unit 306 and the resumption unit 309.

The following describes operations of the present embodiment using the flowchart in FIG. 4.

The lock unit 306 waits for notification of an operation signal of the lock key 107 from the operation unit 305 (S402), and disables external key operations when this notification is received (S404).

The opened/closed detection unit 310 detects if the casing is in a closed state (S406). If the judgment is in the affirmative, processing moves to step S420.

When a closed state is detected, the judging unit 307 waits for notification from the operation unit 305 of a hold-down signal of the side key 203 at least the predetermined time period (S408), and notifies the temporary cancellation unit 308 when the notification is received from the operation unit 305.

The temporary cancellation unit 308 instructs the lock unit 306 to temporarily cancel disablement of external key operations, whereby the lock unit 306 temporarily cancels the external key operation disablement setting (S410).

After initializing the timer, the resumption unit 309 initiates the timer and measures time (S412). The resumption unit 309 judges whether the given time period has elapsed (S414), and instructs the lock unit 306 to terminate the temporary cancellation if the judgment is in the affirmative. The lock unit 306 returns to the external key operation disablement setting (S415), and processing returns to step S406.

If the given time period has not elapsed, the resumption unit 309 judges whether an external key operation has been notified by the operation unit 305 (S416). If the judgment is in the affirmative, processing returns to step S412, while if the judgment is in the negative, the resumption unit 309 judges whether there has been a notification of the opened/closed detection unit 310 having detected an opened state (S418). Processing returns to step S414 if there is no notification of an opened state, whereas the lock unit 306 is instructed to terminate the temporary cancellation if there is notification of an opened state, and processing moves to step S420.

In step S420, the lock unit 306 judges whether a signal indicating a depression of the lock cancellation key 107 has been notified by the operation unit 305. If the judgment is in the affirmative, processing returns to step S406, whereas if the judgment is in the negative, the external key operation disablement setting is cancelled (S422), and processing ends.

As described above, even if the mobile phone 101 is in a closed state as shown in FIG. 2, a user can temporarily cancel the external key operation disablement setting (i.e. when the lock function is enabled) by holding down the side key 203, thereby facilitating operation of the five-way key 205 or the side key 203.

As a result, it is possible to quickly adjust the volume, etc. while receiving an FM broadcast.

It is also possible to enjoy net surfing while in a closed state by displaying web pages on the sub-screen 204 and operating the five-way key 205.

Note that although the structure of the present embodiment is shown in FIG. 3, the present invention may of course be described as a program for causing a computer to realize the functions of the constituent elements, and a computer installed in a mobile phone may be caused to execute the program.

Although the lock key 107 is the center key of the five-way key 106 in the above embodiment, another key may of course be designated the specified key. Disabling the external key operation disablement may of course be made conditional upon holding down the lock key 107.

Similarly, the side key 203 is made the temporary cancellation operation key of the lock function, although another key may of course be used.

In the above embodiment, the judging unit 307 makes judgments regarding holding down of the side key 203 and temporary cancellation of the lock function, although the judging unit 307 may judge to temporarily cancel the lock function upon receiving notification of a non-ordinary operation or a plurality of short operations such as a double click in which a short press is repeated twice in quick succession.

If the side key 203 is not provided, the five-way key provided on the surface of the folding part 103 may be made to temporarily cancel the key lock function by holding it down or performing a double click.

An icon showing the locked status may be displayed on the sub-screen 204 while the lock function is enabled. Also, a bar graph may be displayed so that the user knows the remaining amount of time in the given time period, which is measured by the timer provided in the resumption unit 309, until the temporary cancellation is terminated.

Although a folding-type mobile phone is described in the above embodiment, the present invention can of course be applied to a sliding-type mobile phone composed of a main body and a sliding part.

Furthermore, although the above embodiment describes a mobile phone, the present invention can be implemented with a mobile communication device such as a mobile terminal device having functions other than a communication function, such as for example, an FM or TV reception function.

Industrial Applicability

Due to its user-friendliness, a mobile communication device pertaining to the present invention can stimulate the production and sales of mobile communication devices in the consumer electronics industry.

The invention claimed is:

1. A mobile communication device having an openable/closable case, a plurality of first operation units that are operable regardless of whether the case is opened or closed, a plurality of second operation units that are operable only when the case is opened, and a locking function for disabling processing associated with operation of the first and second operation units, comprising:
   an opened/closed detection unit operable to detect an opened/closed state of the case;
   a judging unit operable to judge whether a predetermined operation has been performed on at least one of the first operation units with the case in a closed state and the locking function enabled; and
   an operation control unit operable, when the judging unit has judged in the affirmative, to enable processing associated with operation of at least one of the first operation units by temporarily canceling the locking function for at least a predetermined time period, wherein
   while the locking function is being temporarily cancelled, if a new operation is performed on at least one of the first operation units within the predetermined time period since a last operation performed on at least one of the first operation units, the operation control unit restarts counting the predetermined time period from the time of the new operation performed on at least one of the first operation units, and
   while the locking function is being temporarily cancelled, the operation control unit (i) enables the locking function by terminating the temporal cancellation of the locking function, if the predetermined time period has elapsed since a last operation performed on at least one of the first operation units or if an operation for opening the case is detected, or (ii) maintains the temporal cancellation of the locking function unless the predetermined time period has elapsed since a last operation performed on at least one of the first operation units.

2. The mobile communication device of claim 1, having a main screen operable to display information with the case in an opened state, and further comprising:
   a sub-screen operable to display information with the case in a closed state, wherein
   the first operation units include an operation sub-unit provided on a same surface as the sub-screen and a side key provided on a main body lateral surface, and
   processing associated with operation of the operation sub-unit provided on the same surface as the sub-screen is disabled when the lock function is enabled.

3. A method for controlling a mobile communication device having an openable/closable case, a plurality of first operation units that are operable regardless of whether the case is opened or closed, a plurality of second operation units that are operable only when the case is opened, and a locking function for disabling processing associated with operation of the first and second operation units, comprising the steps of:
   detecting an opened/closed state of the case;
   judging whether a predetermined operation has been performed on at least one of the first operation units with the case in a closed state and the locking function enabled;
   when the judging step has judged in the affirmative, enabling processing associated with operation of at least one of the first operation units by temporarily canceling the locking function for at least a predetermined time period;
   while the locking function is being temporarily cancelled, if a new operation is performed on at least one of the first operation units within the predetermined time period since a last operation performed on at least one of the first operation units, restarting counting of the predetermined time period from the time of the new operation performed on at least one of the first operation units; and
   while the locking function is being temporarily cancelled, (i) enabling the locking function by terminating the temporal cancellation of the locking function, if the predetermined time period has elapsed since a last operation performed on at least one of the first operation units or if an operation for opening the case is detected, or (ii) maintaining the temporal cancellation of the locking function unless the predetermined time period has elapsed since a last operation performed on at least one of the first operation units.

* * * * *